July 21, 1942.　　J. G. MARSHALL　　2,290,376
OZONIZING APPARATUS
Filed Jan. 27, 1940　　2 Sheets—Sheet 1
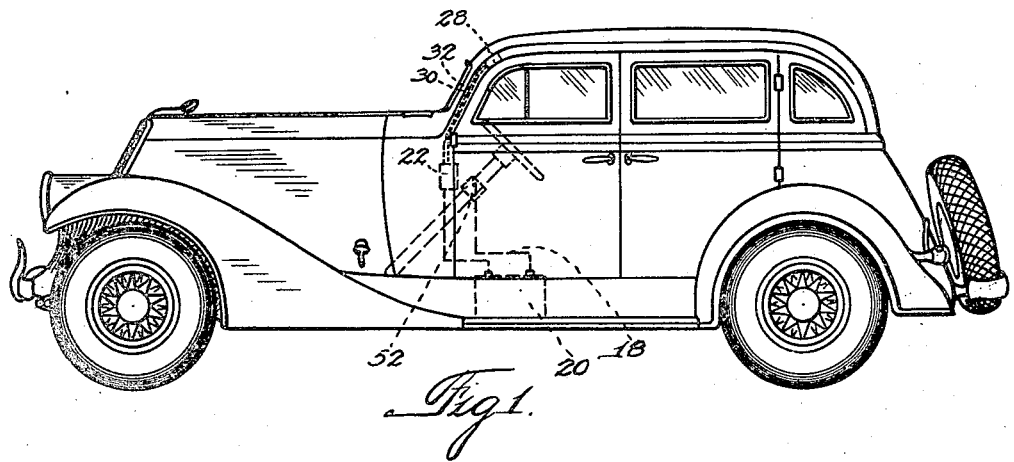
Fig. 1.
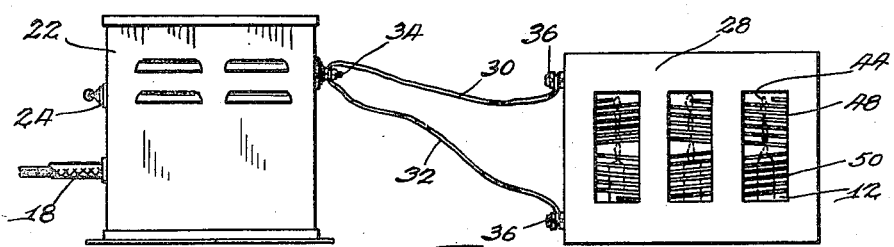
Fig. 2.
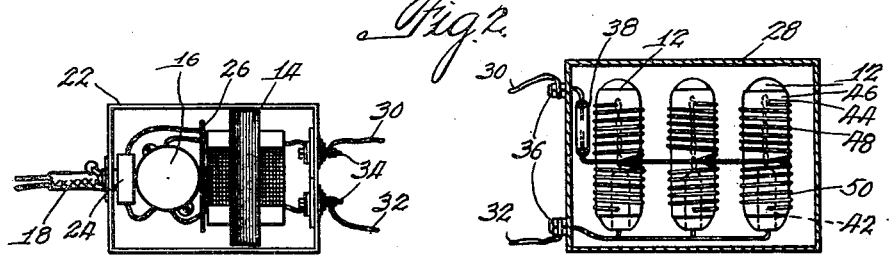
Fig. 3.　　Fig. 4.
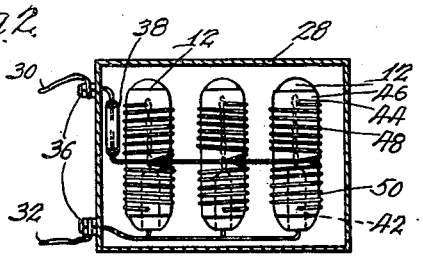
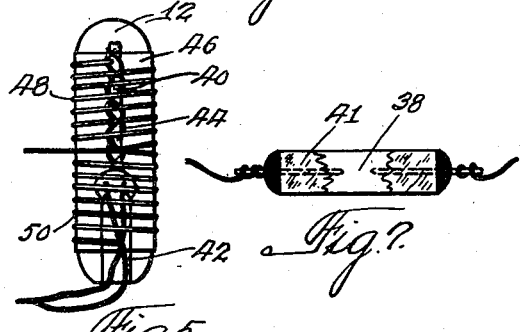
Fig. 5.　　Fig. 7.　　Fig. 6.
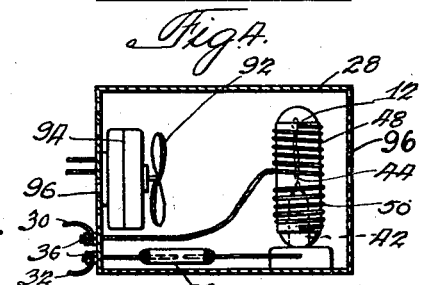
Inventor
John Gosnold Marshall
By Ames, Thiess, Olson, & Mecklenburger
Attys.

July 21, 1942.  J. G. MARSHALL  2,290,376
OZONIZING APPARATUS
Filed Jan. 27, 1940  2 Sheets-Sheet 2
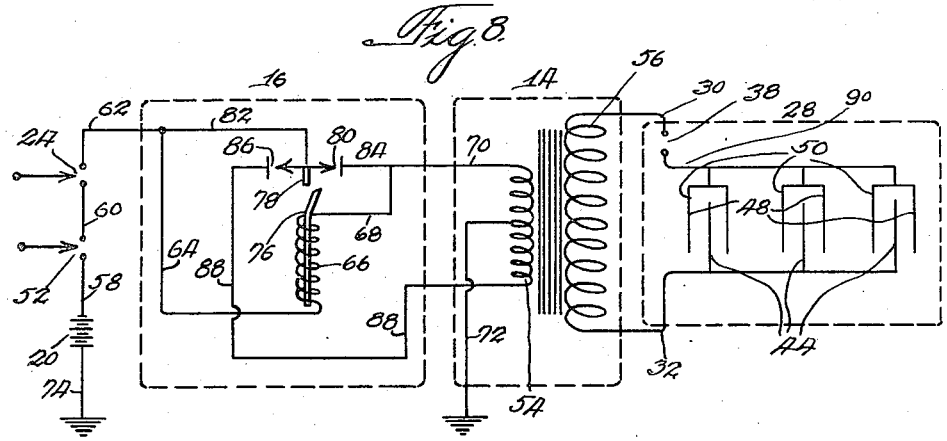
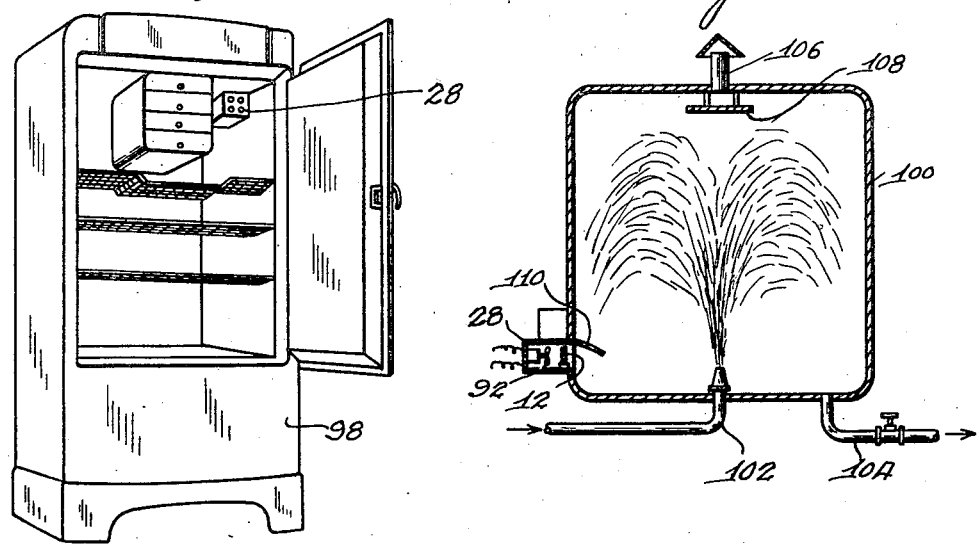

Patented July 21, 1942

2,290,376

UNITED STATES PATENT OFFICE 2,290,376

OZONIZING APPARATUS

John Gosnold Marshall, Chicago, Ill., assignor of one-half to Milton Kohn, Chicago, Ill.

Application January 27, 1940, Serial No. 316,051

2 Claims. (Cl. 204—316)

This invention relates to an ozonizing apparatus and has for an object the provision of an improved method and apparatus for the production of ozone from atmospheric oxygen.

Ozone may be formed from atmospheric oxygen by electrical discharges such as a high potential spark which is caused to pass between two electrodes or by a silent or static discharge which may be effected by applying high potentials to suitable conductors. In accordance with this invention, an ozonizer of the silent discharge type has been provided which will produce increased amounts of ozone from atmospheric oxygen.

It has been discovered that ozone will react with carbon monoxide present in the atmosphere to form oxygen and carbon dioxide in accordance with the following chemical reaction:

$$O_3 + CO \rightarrow O_2 + CO_2$$

An ozonizer constructed in accordance with the present disclosure, operated in a chamber, compartment or enclosed air space containing carbon monoxide, will oxidize the monoxide to carbon dioxide, an innocuous gas at ordinary low concentrations. Consequently, the device of this invention is particularly useful in enclosed motor vehicles such as automobiles, airplanes, motor boats, and the like where there exists the possibility of carbon monoxide poisoning. Ozonizers embodying this invention may be operated by an ordinary six volt storage battery as the current source. The apparatus constructed in accordance with the present invention is constructed so that there is substantially no radio interference produced and a radio may then be operated satisfactorily in the same vehicle in which the apparatus is installed.

An ordinary open spark gap exposed to the atmosphere for the production of ozone forms some quantities of noxious oxides of nitrogen. An ozonizer employed for producing ozone in enclosed compartments should be of such construction that substantially no nitrogen oxides are formed by the electrical discharge. It is, therefore, a further object of this invention to provide a device for liberating ozone within the enclosure of a motor vehicle without the formation of oxides of nitrogen.

The ozonizer constructed in accordance with this invention is small and compact and capable of liberating increased amounts of ozone into the atmosphere. The device may be installed in a cabinet containing food, such as a refrigerator or other apparatus, whereby the liberated ozone exerts a deodorizing and sterilizing effect on the foods present therein. Further, in accorda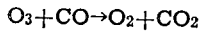 with this invention, liquids such as water or milk may be treated with ozone in a suitable chamber, cabinet, or other apparatus, in order to exert a deodorizing or sterilizing effect thereon. Consequently, it is an additional object of this invention to provide a means for treating liquids such as milk, water, and the like, with considerable quantities of ozone.

Further objects will appear from the following description, the accompanying drawings, and the appended claims.

In accordance with this invention, ozone may be formed from atmospheric oxygen adjacent the surface of a sealed tube filled with argon or other suitable gas. The tube has associated therewith one electrode sealed inside of the tube and extending therein for a substantial distance. A second electrode may comprise coils of wire wrapped around the outside surfaces of the tube and which may be separated therefrom by a thin sheet of mica. The ozone is generated adjacent the surfaces of the tube when a high potential is applied to the electrodes. The high voltage may be supplied from a transformer which may be connected to an ordinary source of alternating or pulsating current. The voltages found to be most desirable for operating the ozonizer tubes herein described are of the magnitude of about 4,000 volts. The transformer may be of the current limiting type which will deliver not more than about 15 milliamperes. The ozonizer tubes, when operated from the transformer, produce a violet light or corona simultaneous with the liberation of ozone into the air. The tubes are of the silent discharge type and produce substantially pure ozone without incidental formation of oxides of nitrogen. In accordance with this invention, it has been discovered that the violet light and consequent ozone production may be greatly enhanced by the provision of a spark gap in the high potential circuit. Thus, as much as from two to three times the amount of ozone is liberated from the surface of the tubes when the spark gap is employed. The spark gap may be enclosed and shielded by metal foil, if desired, to eliminate the possibility of producing radio interference.

In order to obtain a sufficient potential for the operation of the ozonizer tubes from a storage battery such as used in motor vehicles, it is desirable to provide a current interrupter which will convert the current from the storage battery to pulsating or alternating current, whereby a transformer may be employed to step up the current to the desired voltage. The current interrupter is so constructed and shielded that it will provide a sufficiently high potential current for the operation of the ozonizer tubes but which is shielded to insure that no static will be produced which will affect a nearby radio.

For a more complete understanding of this invention, reference will now be had to the drawings, in which Fig. 1 is an automobile in which an ozonizer constructed in accordance with this invention is installed.

Fig. 2 is a side elevation of a current interrupter and transformer unit and an ozonizer tube unit constructed in accordance with one embodiment of this invention.

Fig. 3 is a top plan view of the current interrupter and transformer unit shown in Fig. 2 with the cover removed in order to show the various parts thereof.

Fig. 4 is an interior view, partly in section, of the ozonizer unit shown in Fig. 2.

Fig. 5 is a detail view of one of the ozonizer tubes constructed in accordance with this invention and shown in Fig. 4.

Fig. 6 is a sectional view of a modified ozonizer tube unit constructed in accordance with this invention and containing an electric fan adapted to drive the ozone away from the ozonizer tube as it is formed.

Fig. 7 is a detail view of an enclosed spark gap construction which may be installed in the ozonizer unit in accordance with this invention.

Fig. 8 is a wiring diagram of the circuit connections of the apparatus shown in Figs. 2 to 5.

Fig. 9 is a perspective view of a refrigerator having an ozonizer unit installed therein in accordance with one embodiment of this invention.

Fig. 10 shows a chamber into which liquids may be sprayed and having associated therewith an ozonizer constructed in accordance with one embodiment of this invention.

In accordance with one embodiment of this invention, an ozonizer unit, a portion of which is indicated by the reference numeral 28 in Fig. 1, is installed in an automobile and preferably mounted adjacent the car roof as shown. This unit is operated from a storage battery 20 through a high potential producing unit 22, to which it is connected through the conductors 30 and 32, as will be more fully described in connection with Figs. 2 to 4 and 8.

Figs. 2 to 4 illustrate more clearly the details of the device shown as applied to the motor vehicle in Fig. 1. As shown, the device comprises three ozonizer tubes 12 connected in parallel circuit relation with the secondary winding of a transformer 14, the primary of which is energized through a current interrupter 16 connected by suitable lead-in wires 18 to the storage battery 20 shown in Fig. 1. The transformer 14 and current interrupter 16 are enclosed within a suitable box 22, and a snap switch 24 is provided on the box 22 for opening and closing the circuit, the current interrupter 16 being separated from the transformer 14 by means of an insulating mica plate 26. Suitable electrical connections are provided between the inlet wires 18, the snap switch 24, the current interrupter 16, and the transformer 14, as indicated in the wiring diagram shown in Fig. 8. The high potential from the transformer 14 is applied to the ozonizer tube unit 28 through wires 30 and 32 which extend from the terminals 34 on the transformer box 22 to the terminals 36 on the ozonizer tube unit 28. The ozonizer tube unit 28 comprises a small box containing a plurality of ozonizer tubes 12 electrically connected in parallel. A spark gap 38 enclosed in a glass tube is also provided in the high potential circuit. The gap 38 serves to greatly increase the amount of ozone liberated from the surface of the tubes. As shown in Fig. 7, the spark gap 38 comprises simply a pair of spaced electrodes enclosed in a suitable tube which is preferably shielded with lead foil 41 in order to prevent radio interference.

As indicated in Fig. 5, a single ozonizer tube comprises a sealed glass tube 12 which may contain argon or other suitable gas. A glass rod 40 and support 42 extend within the glass tube 12 and serve to support the twisted wire electrode 44 positioned therein. A sheet of mica 46 or other dielectric material covers the surface of the tube 12, over which is wound a pair of helices 48 and 50 extending outwardly from the central portion and electrically connected together to form the second electrode for the ozonizer tube.

The operation of the ozonizer tubes 12 shown in Figs. 2, 3, and 4 is controlled by the snap switch 24. When the device is installed in a motor vehicle such as an automobile, the current supply line may also be connected in series with the ignition switch 52 of the vehicle so that the ozonizer will operate only when the switch is turned to the "on" position.

For a more complete understanding of the operation of the unit shown in Figs. 2 to 4, reference will now be had to the wiring diagram shown in Fig. 8 which shows the electrical connections. The vibrating current interrupter indicated generally at 16 co-operates with the primary coil 54 of the transformer indicated generally at 14 in order to induce suitable high potentials in the secondary coils 56 for operation of the ozonizer tubes which are indicated generally at 28 and are connected in parallel as shown. When the switches 52 and 24 are closed, current passes from the battery 20 through conductor 58, switch 52, conductor 60, switch 24, conductors 62 and 64, coil 66, conductors 68 and 70, the upper portion of the primary coil 54 of the transformer 14, through conductor 72 to the ground, and from the ground through conductor 74 to the battery 20. Energization of the coil 66 magnetizes the bar magnet 76, around which the coil is wound, and the iron vibrating member 78 is thereby pulled to the right, closing the contacts 80. When the contacts 80 are closed, the current is short circuited around the coil 66 through the conductor 82, the contacts 80, and the conductor 84. The bar 76 thus becomes demagnetized and the vibrating member 78 swings back to the left, whereby contacts 80 are opened and a second pair of contacts 86 are closed, causing the current to flow through conductor 82, contacts 86, conductor 88, to the lower half of the primary coil 54 of the transformer 14, through the conductor 72 to the ground, and back to the battery 20 through the conductor 74.

The contacts 86 are only closed momentarily, however, as opening of the contacts 80 removes the short circuit from about the coil 66 and the vibrating member 78 is immediately again pulled to the right. The member 78, as will be understood by those skilled in the art, is thus caused to vibrate at a fixed frequency alternately to close and open the contacts 80 and 86.

It will thus be evident that a current first flows to the primary coil 54 through the line 70 and then through the line 88. Thus, the current alternately flows in one direction through half the coil and in the opposite direction through the other half of the coil, and consequently an alternating current is induced in the secondary coil 56 of the transformer 14. The secondary circuit is connected through the line 30 to the spark gap 38 and line 90 to the electrodes 48 and 50 of the ozonizer tubes 12. The opposite electrodes 46 of the ozonizer tubes 12 are connected through the line 32 to the opposite side of the secondary coil 56 of the transformer 14.

The ozonizer described above is operable from an ordinary six volt storage battery 20 and may liberate sufficient ozone in the interior of a motor vehicle to destroy substantially all of the carbon monoxide which may be adventitiously present therein. It is, of course, not necessary to use three tubes as indicated in the above example, since only one tube or any other number of tubes will suffice, depending upon the amount of ozone that it is desired to liberate. The current interrupter 16 and the spark gap 38 are shielded by sheet metal or foil in any suitable manner so that the ozonizer will not interfere with radio reception.

If desired, an ozonizer unit having an electric fan may be provided in order that the ozone produced may be readily removed from the unit to the desired areas. This may be accomplished by a structure somewhat as indicated in Fig. 6, wherein the fan 92 operated by an electric motor 94 is employed. Suitable vent holes 96 are provided in the case 28 in order to permit free passage of the circulated air through the device.

It may, of course, be desirable to provide suitable shields and protective devices such as screens and the like, to prevent accidental breakage of the ozonizer tubes. The silent or static discharge of the tubes produces substantially no radio interference and no noxious oxides of nitrogen are formed during the operation of the device.

Fig. 9 shows a refrigerator 98 having a unit 28 such as indicated in Fig. 6 installed in the interior thereof. The transformer in this arrangement is preferably positioned outside of the refrigerator cabinet in order to prevent it from becoming damp, resulting in possible short circuiting. It is also desirable that the unit 28 be positioned in the refrigerator adjacent the top and in such a manner that water will not come into contact with the electrical elements.

In Fig. 10 a chamber 100 having a liquid spray nozzle 102 and a liquid outlet 104 is provided whereby liquid may be sprayed directly into the chamber. An air vent 106 is provided in the chamber 100 having a baffle plate 108 associated therewith for preventing liquid spray from being projected directly outwardly through the air vent. A unit 28 such as shown in Fig. 6 is provided outside and adjacent the lower edge of a chamber 100 whereby ozonized air may be forced directly into the chamber and come into contact with the liquid spray produced therein. A baffle plate 110 is provided to prevent liquid from the spray from falling on the ozonizer tube 12. The ozonizer tube will remain substantially dry at all times, since air is drawn from the outside by the fan 92 and passed inwardly into the chamber 100.

Of course, when a source of alternating current supply is available for the device, the current interrupter may be dispensed with, since the current may be stepped up to the desired voltage directly by means of a suitable transformer.

It will be observed from the above description that a highly efficient ozonizer has been produced which may be operated from either alternating current or the current supplied by an ordinary six volt battery. Increased amounts of ozone may be formed from the ozonizer tubes by providing a spark gap in the secondary circuit. Means has been provided for the production of ozone free from oxides of nitrogen in enclosed spaces such as the interiors of motor vehicles and the like. A highly efficient ozonizer has also been provided which may be installed in refrigerators for deodorizing purposes and the destruction of microorganisms found on foods contained therein. A further means has been provided for treating liquids by means of an ozonizer constructed in accordance with this invention.

While several particular embodiments of this invention are shown above, it will be understood, of course, that the invention is not to be limited thereto since many modifications may be made, and it is contemplated, therefore, to cover any such modifications as fall within the true spirit and scope of this invention as defined by the appended claims.

I claim:

1. An ozonizer tube for continuous production of ozone containing a minimum amount of noxious oxides of nitrogen comprising, an elongated sealed tube of dielectric material, an elongated inner electrode axially disposed within said tube, and an outer electrode of wire in the form of centrally joined oppositely wound coaxial helices forming opposed inductances spaced circumferentially equidistant from said inner electrode, whereby adjacent ends of said inductances are always of like polarity and are magnetically repellent irrespective of changes in the direction of current flow through said electrode.

2. A compact self-contained ozonizer for use in a motor vehicle and operable from the usual low voltage storage battery thereof comprising, an elongated sealed tube of dielectric material, an elongated central electrode axially disposed within said tube, an outer electrode comprising a smooth surfaced wire helically wound about the outer surface of said tube with all portions thereof spaced circumferentially equidistant from said central electrode, a converter connected to said battery, a step-up transformer connected to said converter and to said electrodes to deliver a high potential alternating current to said spaced electrodes, and an electrically shielded spark gap in the circuit of said central electrode whereby a uniform soft corona glow is generated about said outer electrode upon impressment of a high potential current upon said electrodes.

JOHN GOSNOLD MARSHALL.